United States Patent
Prokhorov et al.

(10) Patent No.: US 10,442,334 B2
(45) Date of Patent: Oct. 15, 2019

(54) TILTING A HUMAN SUPPORT SURFACE IN A VEHICLE

(71) Applicant: Toyota Motor Engineering & Manufacturing North America, Inc., Erlanger, KY (US)

(72) Inventors: Danil V. Prokhorov, Canton, MI (US); Richard M. Sullivan, Canton, MI (US); Paxton S. Williams, Milan, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 219 days.

(21) Appl. No.: 15/610,965

(22) Filed: Jun. 1, 2017

(65) Prior Publication Data
US 2018/0345841 A1    Dec. 6, 2018

(51) Int. Cl.
| | | |
|---|---|---|
| *B60N 3/00* | (2006.01) | |
| *A47C 17/04* | (2006.01) | |
| *B60N 2/02* | (2006.01) | |
| *B60N 2/14* | (2006.01) | |

(52) U.S. Cl.
CPC ........... *B60N 3/008* (2013.01); *B60N 2/0244* (2013.01); *B60N 2/14* (2013.01); *B60N 2002/0204* (2013.01); *B60N 2002/0268* (2013.01)

(58) Field of Classification Search
CPC .. B60N 3/008; B60N 2002/0268; B60N 2/10; B60N 2/0244; B60N 2/14; B60N 2002/0204
USPC .......................................................... 701/49
See application file for complete search history.

(56) References Cited

U.S. PATENT DOCUMENTS

| | | | |
|---|---|---|---|
| 7,146,662 B1 | 12/2006 | Pollard et al. | |
| 2014/0316661 A1* | 10/2014 | Parker | B60N 2/39 701/49 |
| 2017/0129372 A1* | 5/2017 | Hein | B60N 2/39 |
| 2017/0129373 A1* | 5/2017 | Knox | B60N 2/10 |
| 2017/0203673 A1* | 7/2017 | Parker | B60N 2/39 |

\* cited by examiner

*Primary Examiner* — Brian P Sweeney
(74) *Attorney, Agent, or Firm* — Christopher G. Darrow; Darrow Mustafa PC

(57) ABSTRACT

Various examples of tilting a human support surface in a vehicle are disclosed. A frame is attached to the surface of the vehicle. The vehicle also includes rotation system mounted between the frame and a vehicle surface. The rotation system can be controlled to tilt a human support surface of the frame towards a direction of acceleration associated with a driving maneuver as the driving maneuver is executed.

12 Claims, 5 Drawing Sheets

TILTING A HUMAN SUPPORT SURFACE IN A VEHICLE

TECHNICAL FIELD

The present disclosure generally relates to human support surfaces and, more particularly, to manipulation of human support surfaces in a vehicle.

BACKGROUND

Many vehicles, such as recreational vehicles, currently have furniture that includes human support surfaces (e.g., beds, couches, seats, etc.) that an occupant can sit and/or lay on. Where an occupant is sleeping or laying on a human support surface and the vehicle experiences accelerations as a result of one or more maneuvers of the vehicle, the occupant laying down may shift position because of changes in the occupant's inertia, and be disturbed and awoken as a result.

SUMMARY

A vehicle can have a frame with a human support surface. The vehicle can also include a rotation system that rotates the frame to tilt the human support surface so as to counter an acceleration for the one or more maneuver(s). Such arrangements can increase support for the occupant laying on the human support surface and mitigate shifting of position of the occupant due to the changes in the occupant's inertia.

One example can include a system for tilting a human support surface in a vehicle. The system can include a frame having a human support surface. The system can also include a rotation system mounted between the frame and a vehicle surface, the rotation system including one or more actuators operable to impart rotation of the frame. The system can also include a processor operatively connected to one or more actuators. The system can also include memory operatively connected to the processor. The memory can store an acceleration identification module including instructions that, when executed by the processor, cause the processor to identify an acceleration associated with execution of a driving maneuver. The memory can also store an actuator control module including instructions that, when executed by the processor, cause the processor to generate one or more actuator control signals for the one or more actuators to tilt the human support surface, by rotating the frame, so as to counter the acceleration as the driving maneuver is executed.

Another example can include a method of tilting a human support surface in a vehicle. The method can include identifying an acceleration associated with execution of a driving maneuver. The method can also include generating one or more actuator control signals for one or more actuators to tilt the human support surface, by rotating the frame, so as to counter the acceleration as the driving maneuver is executed.

DETAILED DESCRIPTION

This disclosure teaches systems and methods for tilting a human support surface in a vehicle. A frame is attached to the surface of the vehicle. The vehicle also includes rotation system mounted between the frame and a vehicle surface. The rotation system can be controlled to tilt a human support surface of the frame so as to counter an acceleration associated with a driving maneuver as the driving maneuver is executed.

Figure 1:
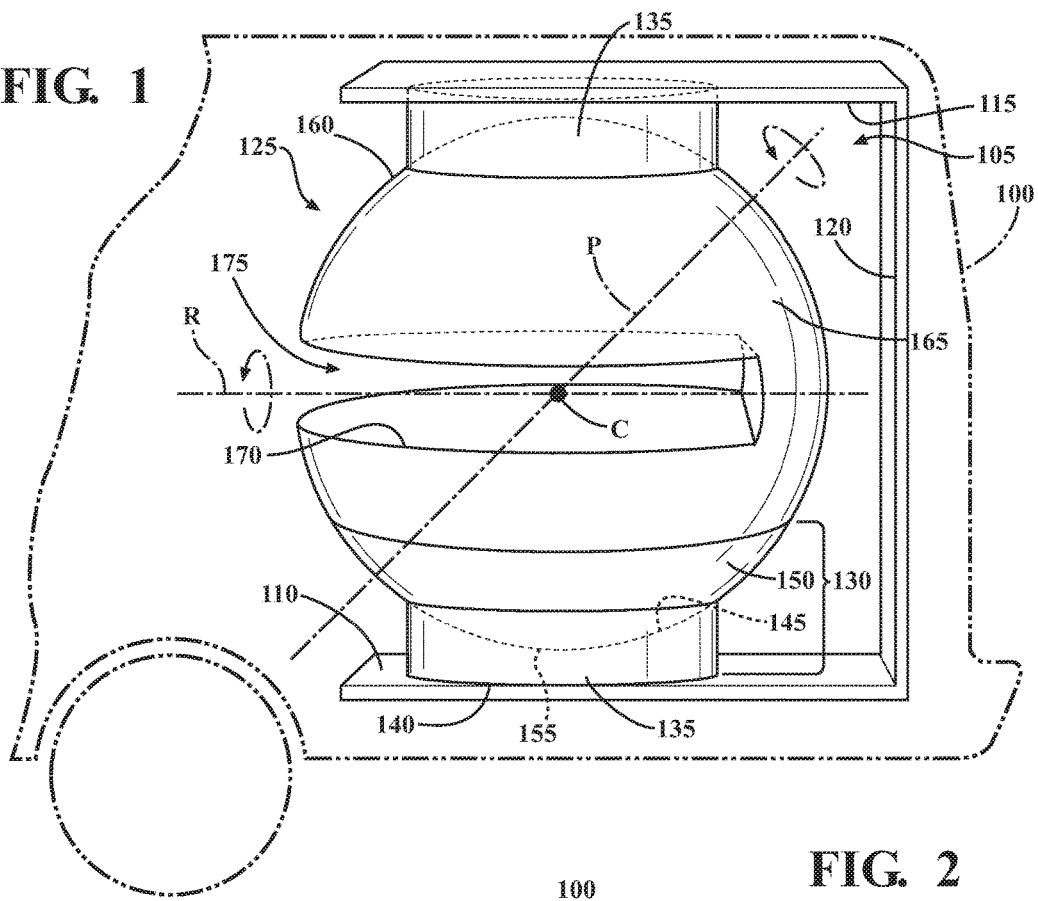
FIG. 1 depicts an example of an interior portion of a vehicle having a frame with a human support surface.

Referring to FIG. 1, a portion of a representative vehicle 100 shown in phantom. In this description, uses of "front," "forward" and the like, and uses of "rear," "rearward" and the like, refer to the longitudinal direction of the vehicle 100. "Front," "forward" and the like refer to the front (fore) of the vehicle 100, while "rear," "rearward" and the like refer to the back (aft) of the vehicle 100. Similarly, uses of "left," "right," "sides" and the like refer to the transverse direction of the vehicle 100. "Left," or similar terms, refers to the left side (port) of the vehicle 100, while "right," or other similar terms, refers to the right side (starboard) of the vehicle 100.

In one or more arrangements, the vehicle 100 is a recreational vehicle. However, in other arrangements, the vehicle 100 can also be a sport utility vehicle (SUV), semi-truck, or other form of automobile. While arrangements will be described herein with respect to automobiles, it will be understood that examples disclosed herein are not limited to automobiles. To the contrary, the examples disclosed herein can include any other type of vehicle that can benefit from the disclosed systems and methods (e.g., trains, watercraft, etc.).

The vehicle 100 includes an interior portion 105 (or passenger compartment). The interior portion 105 can have surfaces, such as a floor 110, a ceiling 115, walls 120 (left side walls, right side walls, rear walls), etc., which can define the interior portion 105.

The vehicle 100 can include a frame 125. The frame 125 can be a structure retaining and/or supporting one or more objects or components. While the frame 125 is shown as generally sphere-shaped, it is noted that the frame 125 can be any shape. As used throughout the present description, "sphere-shaped" means shaped as a sphere, whereas, "spherical" means having the form of a sphere or one of its segments. As such, an object may be spherical, but not sphere-shaped. In some arrangements, a portion of the frame 125 may be spherical, or domed. The frame 125 can be constructed of any material, such as, for example, plastics, composite metals, wood, fiber-reinforced polymers, etc.

The frame 125 can be operatively connected to the interior portion 105 of the vehicle 100. The term "operatively connected," as used throughout this description, can include direct or indirect connections, including connections without direct physical contact. In one or more arrangements, the frame 125 can be operatively connected to the floor 110 of the interior portion 105. In other arrangements, the frame 125 can be connected to other surfaces of the interior portion 105 (e.g., the ceiling 115, one or more walls 120, etc.). Additionally, the frame 125 can be operatively connected to two or more surfaces of the interior portion 105 (e.g., the floor 110 and the ceiling 115, the floor 110 and one or more walls 120, etc.).

The frame 125 can define one or more axes. For example, the frame 125 can define a pitch axis P, and a roll axis R. The pitch axis P can extend through the frame 125 between the left and right side walls 120 of the vehicle 100. The roll axis R can extend through the frame 125 from the front of the vehicle 100 to the rear of the vehicle 100. While these example axes are described, the present disclosure is not limited to these axes, and the frame can define other axes, such as a yaw axis that extends through the frame 125 from the floor 110 to the ceiling 115 of the vehicle 100, for example. The pitch axis P, and roll axis R can intersect in the frame at a reference point C. In some arrangements, the reference point C can be a center of the frame 125. However, in other arrangements, the reference point C can be in another location on or in the frame 125 (e.g., on a surface of the frame 125, or anywhere inside the frame 125).

The vehicle 100 can include a rotation system 130. The rotation system 130 can be mounted between the frame 125 and a vehicle surface (e.g., the floor 110, the ceiling 115, one or more walls 120, etc.). The rotation system 130 can include components for rotating the frame 125 with respect to the vehicle surface.

The rotation system 130 can include an actuator plate 135. As will be discussed in greater detail below, the actuator plate can be any component or group of components capable of moving the frame 125. In some arrangements, the actuator plate 135 can be mounted to the vehicle 100. In other arrangements, the actuator plate 135 can be mounted to the frame 125. The actuator plate 135 can include a mounting face 140 and an actuator face 145 opposite the mounting face 140. In one or more arrangements, the actuator plate 135 can be mechanically coupled to, for example, the floor 110 of the vehicle 100 with the mounting face 140 in contact with the floor 110, as shown. In some arrangements, the vehicle 100 can include two or more actuator plate(s) 135 attached to various vehicle surfaces. In other arrangements, the vehicle 100 may only include one actuator plate 135.

The actuator face 145 can be in contact with the frame 125. In some arrangements, the actuator face 145 can have a surface contour that is complementary to a surface contour of the frame 125. For example, where the frame 125 is, at least partially, spherical, the actuator face 145 can have a concave surface contour that complements the frame 125.

As will be discussed in greater detail below, the actuator plate 135 can be used to rotate the frame 125. Additionally, in some arrangements, the actuator plate 135 can be used to support and, at least partially, retain the frame 125. In this regard, the actuator plate 135 can prevent or inhibit the frame 125 from moving within the vehicle 100. In other arrangements, the vehicle 100 can include separate components (such as various support structures) that are used or usable to prevent the frame 125 from moving within the vehicle 100.

Figure 2:
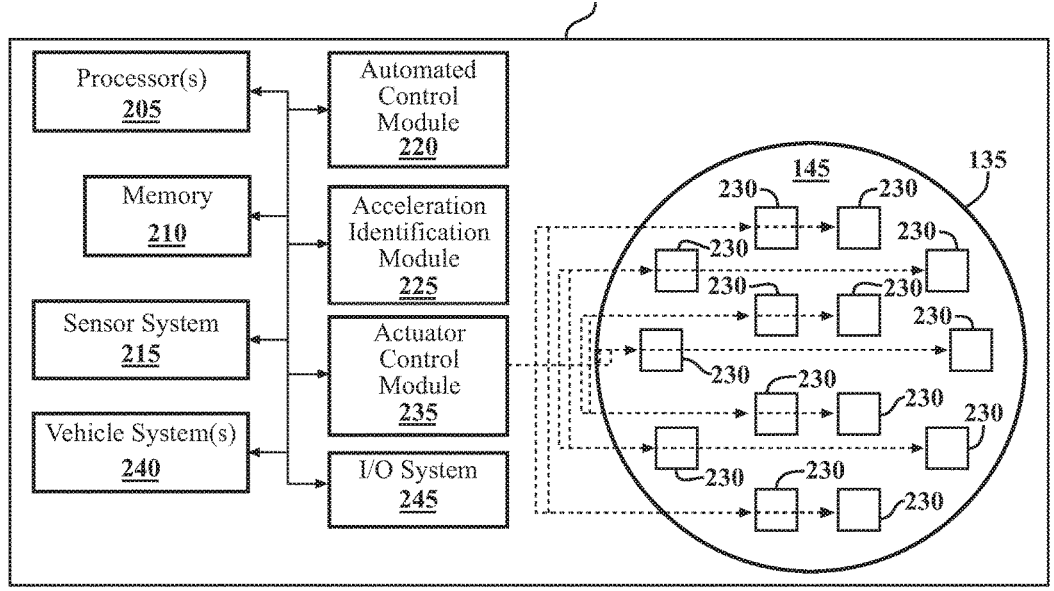
FIG. 2 depicts a schematic view of the vehicle of FIG. 1.

The actuator plate 135 can carry an array of actuators 230 (of FIG. 2). While described as an array of actuators 230, in some examples, the actuator plate 135 may only include one actuator 230. The actuator(s) 230 can be operable to rotate the frame 125 about the reference point C along the pitch axis P, and/or roll axis R, as will be discussed in greater detail below. Further, the actuator(s) 230 can be operated in various combinations to produce multi-axis rotation of the frame about the reference point C.

The actuator face 145 can be defined by the actuator(s) 230. The actuator(s) 230 can be arranged on the actuator plate 135 to have a contour. In this regard, the actuator face 145 can have a contour that is defined by the contour of the actuator(s) 230 arranged on the actuator plate 135. For example, the array of actuator(s) 230 can lie in a common contour (such as a domed contour), and therefore the actuator face 145 can have a domed contour.

The rotation system 130 can include a glide plate 150. The glide plate 150 can define a glide face 155 that complements the actuator face 145. The glide plate 150 can be seated against the actuator plate 135. In some arrangements, both the glide face 155 and the actuator face 145 may be domed. For example, both the glide face 155 and the actuator face 145 can be spherical. In one example, the glide face 155 can be convex, and the actuator face 155 can be concave (or vice versa). The glide face 155 can move along the actuator face 145 in response to rotational movement of the actuator(s) 230. In some arrangements, the glide plate 150 can be mounted to or otherwise a feature of the frame 125, and the actuator plate 135 can be mounted to the vehicle surface.

The frame 125 can include a shell portion 160 and an interior portion 165. The shell portion 160 can be an outermost portion of the frame 125 (e.g., defining the outer surface of the frame 125), and the interior portion 165 can be one or more surfaces inside the shell portion 160. In this regard, where the frame 125 is spherical, the shell portion 160 may be, at least, spherical in shape. The shell portion 160 may be constructed of solid metal, composite metals or polymers, or other hardened material. The interior portion 165 may be formed of a cushioned material, such as, for example, memory foam. In some arrangements, the shell portion 160 can be sphere-shaped.

In some arrangements, the glide plate 150 of the rotation system 130 can be a feature of the shell portion 160. In this regard, the glide plate 150 can be a component of the shell portion 160, or the glide plate 150 can be attached to the shell portion 160. In arrangements where the shell portion 160 is sphere-shaped, spherical, or domed, the glide plate 150 can be attached to a convex side of the shell portion 160.

The frame 125 can include a human support surface 170 in the interior portion 165. In some examples, the human support surface 170 can be a portion of a bed that a person lays on. While described herein as a portion of a bed, the human support surface 170 is not limited to bed, and can include other examples of support surfaces in furniture, such as a seat in a chair or sofa, etc. The human support surface 170 can generally be an upwardly facing surface. In this regard, the human support surface 170 can extend in a generally horizontal orientation.

The shell portion 160 of the frame 125 can have a cutout region 175 where an occupant of the vehicle 100 can access the human support surface 170 of the interior portion 165. The occupant of the vehicle 100 can ingress to egress from the human support surface 170 via the cutout region 175.

Referring now to FIG. 2, a schematic view of the vehicle 100 is shown. Some of the possible elements of the vehicle 100 are shown in FIG. 2 and will be described along with subsequent figures. However, a description of several of the elements in FIG. 2 will be provided after the discussion of FIG. 2-FIG. 5 for purposes of brevity of this description.

The vehicle 100 can include one or more processor(s) 205. The processor(s) 205 are configured to implement or perform various functions described herein. In one or more arrangements, the processor(s) 205 can be a main processor of the vehicle 100. For instance, the processor(s) 205 can be an electronic control unit (ECU). The vehicle 100 can also include memory 210 for storing one or more types of data. The memory 210 can be a component of the processor(s) 205, or the memory 210 can be operatively connected to the processor(s) 205 for use thereby.

The vehicle 100 can include a sensor system 215. The sensor system 215 can include one or more sensors. In one example, the sensor system 215 can include an acceleration sensor. The acceleration sensor may be an inertial measurement unit (IMU), a gyroscope, an accelerometer, or any other sensor or components configured to detect a rate of change of velocity of the vehicle 100. The acceleration sensor can be used to detect and/or verify accelerations, and adjust one or more components of the vehicle 100 accordingly, as will be discussed in greater detail below.

In one or more arrangements, the memory 210 can include various instructions stored thereon. In one or more arrangements, the memory 210 can store one or more modules. Modules can be or include computer-readable instructions that, when executed by the processor(s) 205, cause the processor(s) 205 to perform the various functions disclosed herein. While one or more modules can be stored on memory 210, it should be noted the various modules can be stored on and/or be a component of the processor(s) 205, can be remotely stored and accessible by the processor(s), etc.

The vehicle 100 can include one or more automated control modules 220. As will be discussed in greater detail below, the automated control module(s) 220 can include instructions that cause the processor(s) 205 to determine motion of the vehicle 100. For example, the automated control module(s) 220 can determine a speed of the vehicle 100, an acceleration of the vehicle 100, a rotation of the vehicle 100, a direction (e.g., heading) of the vehicle 100, etc.

The automated control module(s) 220 can identify one or more changes in motion (e.g., changes in speed, accelerations, changes in rotation, changes in direction, etc. of the vehicle 100). In one or more examples, the changes in motion may be caused by one or more objects in the external environment of the vehicle 100. In one or more examples, the changes in motion may be caused by changes to the roadway (e.g., road topology, number of lanes, speed limit, etc.). In one or more examples, the changes in motion may be caused by the vehicle 100 following a path to a destination, the path having one or more turns, lane changes, etc.

The automated control module(s) 220 can determine one or more driving maneuvers (e.g., brake, speed up, turn left or right, left or right lane changes, sway left or right, etc.) for implementing the one or more changes in motion. For example, the automated control module(s) 220 can include or otherwise access a database including a plurality of driving maneuvers that the vehicle 100 can perform. Each of the plurality of maneuvers can correspond to a change in motion. The automated control module(s) 220 can determine the driving maneuver associated with the change in motion. Any one of the driving maneuver(s) may cause an occupant of the vehicle 100 to experience an acceleration.

As will be discussed in greater detail below, the automated control module(s) 220 can generate one or more vehicle control signals that cause the vehicle 100 to execute the one or more maneuvers. While this example is described, it should be understood that the vehicle 100 can be controlled by a driver. In this example, the driver can cause the vehicle 100 to implement the one or more driving maneuvers.

In causing the vehicle 100 to execute the one or more maneuvers, one or more occupants of the vehicle 100 may experience acceleration. The acceleration may impart an inertial force on the occupant. "Inertial force," as used throughout the present disclosure, refers to a fictitious force that is imparted on a body upon acceleration. The inertial force on the occupant may be a function of, at least, the acceleration vector (e.g., a function of the magnitude of the acceleration) and the weight of the occupant. If the occupant(s) of the vehicle 100 are laying on or otherwise being supported by the human support surface 170, the occupant(s)' position on the human support surface 170 may shift.

In one or more arrangements, the vehicle 100 can include one or more acceleration identification modules 225. The acceleration identification module(s) 225 can include instructions to determine one or more vehicle accelerations resulting from executing each of the one or more maneuvers. In one or more arrangements, each maneuver may include a direction and a magnitude of acceleration. "Magnitude," as used herein, includes an amount of acceleration, and can include both positive and negative acceleration (e.g., deceleration). The direction of acceleration and magnitude of acceleration can form an acceleration vector for each maneuver.

As one example, a braking maneuver may have a "rear" direction of acceleration, and a magnitude that changes with how hard the vehicle 100 brakes. As another example, a lateral maneuver (e.g., left/right turns, left/right lane changes, sway left/right, etc.) may have a left or right direction of acceleration, and a magnitude that changes with how hard the vehicle 100 sways and/or turns. As shown in both examples, any given maneuver includes a direction and a magnitude, which can be combined into an acceleration vector.

The acceleration identification module(s) 225 can include instructions to identify which maneuvers the vehicle 100 will execute. In one or more arrangements, the automated control module(s) 220 determines one or more upcoming maneuvers to follow, and the acceleration identification module(s) 225 identifies the maneuvers determined via the automated control module(s) 220.

The acceleration identification module(s) 225 can include instructions to determine an acceleration vector for each of the one or more maneuvers that the vehicle 100 will execute. Where the vehicle 100 will execute two or more maneuvers (e.g., a series of maneuvers), the acceleration identification module(s) 225 can determine a first acceleration vector for the first maneuver, a second acceleration vector for the second maneuver, etc.

In some examples, the acceleration identification module(s) 225 can include or otherwise access a database including a plurality of directions of acceleration for a plurality of possible maneuvers that a given vehicle 100 may execute. The acceleration identification module(s) 225 can access the database and identify the direction of acceleration associated with the maneuver determined via the automated control module(s) 220. The acceleration identification module(s) 225 can identify the acceleration vector for the upcoming maneuver(s) by adding a predicted (or identified) magnitude of acceleration for the upcoming maneuver (as determined by the automated control module(s) 220 in the direction of acceleration associated with the upcoming maneuver(s).

In one or more arrangements, the vehicle 100 can identify the vehicle accelerations via the acceleration sensor(s) of the sensor system 215. In this regard, the vehicle 100 can identify the vehicle accelerations as they are occurring. Additionally or alternatively, where the vehicle 100 identifies the accelerations via the database or some other method, the vehicle 100 can verify the identified accelerations via the acceleration sensor(s) of the sensor system 215. In this regard, the acceleration sensor(s) can be used as feedback by the acceleration identification module(s) 225.

Where an occupant is being supported by the human support surface 170 of the frame 125, each acceleration vector may cause movement of the occupant on the human support surface 170 in different directions (due to inertial forces on the occupant from the accelerations).

In the vehicle 100, the actuator(s) 230 can impart or cause to impart a rotational force on the frame 125. As a result, the actuator(s) 230 can rotate the frame 125 about the reference point C (of FIG. 1). As stated above, the actuator(s) 230 can be positioned in an array about the actuator plate 135 and defining the actuator face 145. Each of the actuator(s) 230 can be positioned in different orientations on the actuator plate 135. As a result, each of the actuator(s) 230 can cause to rotate the frame 125 in a different direction. Further, where a combination of actuator(s) 230 are actuated, each of the rotational forces imparted on the frame 125 can be added to generate a resulting magnitude and direction of rotational force on the frame 125.

Figure 3A:
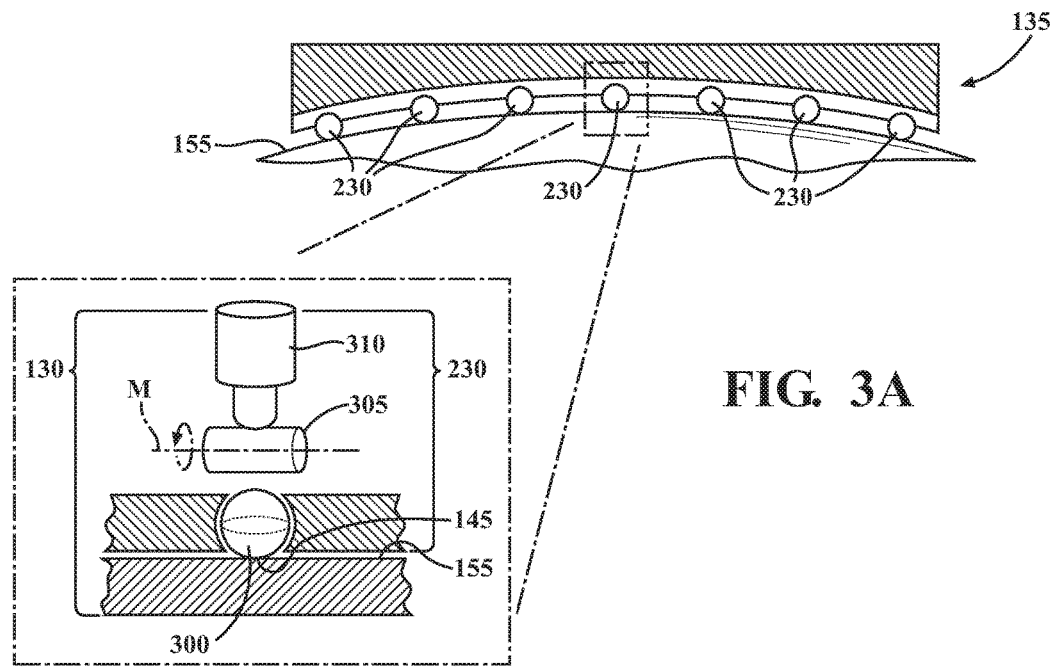
FIG. 3A and FIG. 3B depict respective examples of actuator plates for rotating the frame of FIG. 1.
Figure 3B:
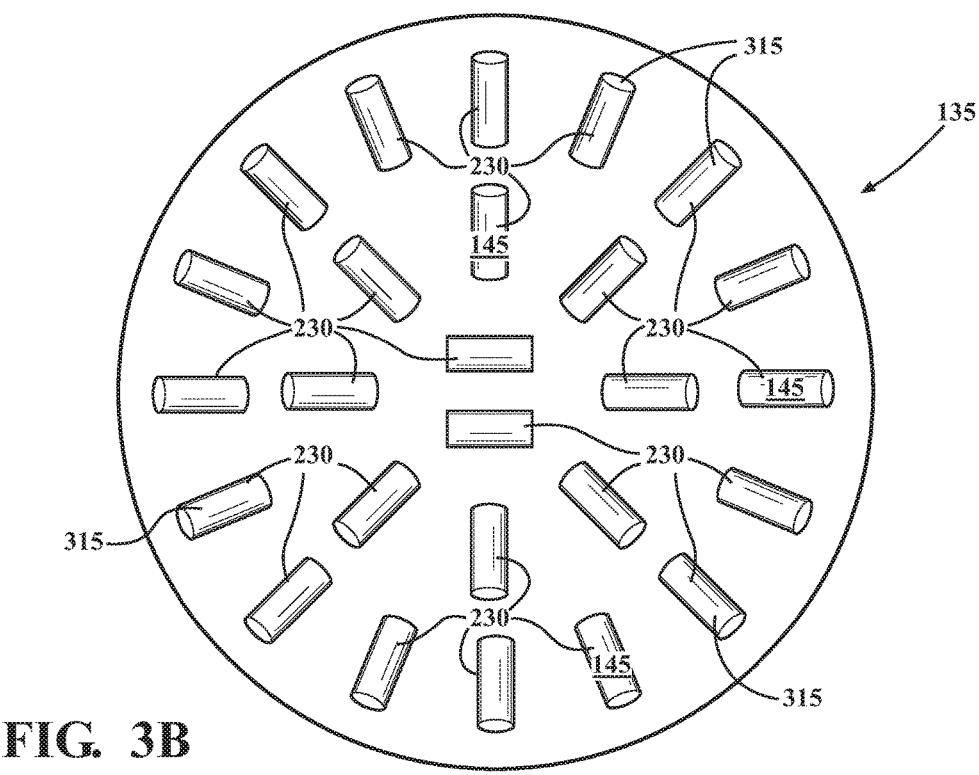

Referring to FIG. 3A and FIG. 3B, two examples of the actuator plate 135 of the rotation system 130, including a plurality of actuator(s) 230, are shown.

In particular, FIG. 3A shows a cross-sectional view of the actuator plate 135, along with a view of an actuator 230. In this example, the actuator 230 includes a sphere-shaped friction roller 300, a powered friction roller 305, and a linear actuator 310. The sphere-shaped friction roller 300 can be configured to rotate in any direction when in contact with the glide face 155 of the frame 125. The powered friction roller 305 can be configured to rotate about the axis M as shown. The linear actuator 310 can be operable to push the powered friction roller 305 onto the sphere-shaped friction roller 300. When the linear actuator 310 pushes the powered friction roller 305 on the sphere-shaped friction roller 300, and the powered friction roller 305 is controlled to rotate about the axis M, the sphere-shaped friction roller 300 can rotate parallel to the axis M and in the opposite direction. Each actuator 230 can have a respective sphere-shaped friction roller 300, powered friction roller 305, and linear actuator 310. Further, the powered friction rollers 305 can be oriented or arranged to have different axes of rotation. As a result, the actuators 230 can impart a rotational force on the body that it is in contact with (e.g., the glide face 155), and the rotational force on the frame 125 can be directed along different axes based on which actuators 230 are controlled. When an actuator 230 is not active, the sphere-shaped friction roller 300 can rotate freely, thus limiting frictional forces on the body that it is in contact with.

FIG. 3B shows a view of actuator face 145 of the actuator plate 135. In this example, the actuators 230 are powered friction roller 315. In some arrangements, the powered friction roller 315 of FIG. 3B may be similar to the powered friction rollers 305 of FIG. 3A. The powered friction rollers 315 can be oriented or arranged to have various axes of rotation. Each of the powered friction rollers 315 can be activated to impart a rotational force on the body that it is in contact with (e.g., the glide face 155), and deactivated to freely rotate about the friction roller's 315 respective axis of rotation. The rotational force imparted on the glide face 155 can be directed along different axes based on which actuators 230 are controlled, and other considerations such as, for example, frictional forces.

Referring back to FIG. 1 and FIG. 2, the vehicle 100 can include one or more actuator control modules 235. The actuator control module(s) 235 can include instructions to generate one or more actuator control signals to transmit to the actuator(s) 230 of the rotation system 130. The actuator control module(s) 235 can control the one or more actuator(s) 230 based on the acceleration vector(s) as identified via the acceleration identification module(s) 225. The actuator control module(s) 235 can control the one or more actuator(s) 230 to change a normal force N of the human support surface 170. "Normal force," or "normal" as used throughout the present disclosure, refers to a force perpendicular to a surface. Therefore, the human support surface 170 may have a normal force N. The actuator control module(s) 235 can identify a direction of acceleration based on the acceleration vector(s), and change the normal force N for the human support surface 170. The actuator control module(s) 235 can change the normal force N for, at least, a portion of the human support surface 170 such that the normal force vector for the portion of the human support surface 170 has a directional component that is opposite the direction of acceleration. More generally, the actuator control module(s) 235 can control one or more actuator(s) 230 to tilt the human support surface 170 so as to counter the acceleration of the vehicle 100. "Tilt," or "tilting" as used herein, refers to changing a slope of a surface. In some arrangements, the actuator control module(s) 235 can, at least in part, tile the human support surface 170 towards the direction of acceleration. "Tilting towards," as used herein, refers to changing a slope of a surface in the direction of a reference point. In the example used above, the actuator control module(s) 235 can tilt the human support surface 170 towards (e.g., slope in the direction of) the direction of acceleration. As a result, the normal force of the human support surface 170 can have a directional component that is in the opposite direction as the direction of acceleration.

Figure 4A:
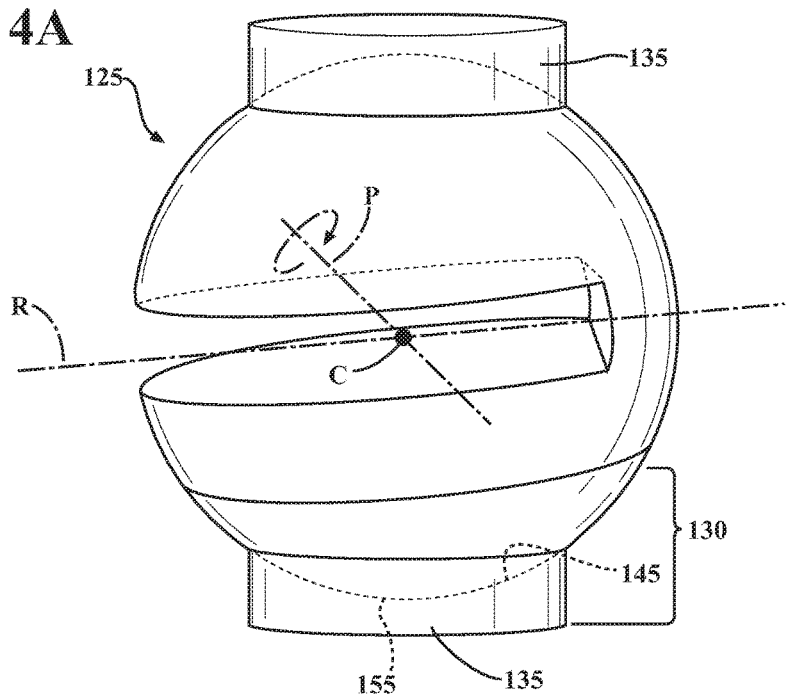
FIG. 4A-FIG. 4D depict example rotations of the frame of FIG. 1 via the example actuator plates of FIG. 3A and FIG. 3B.
Figure 4B:
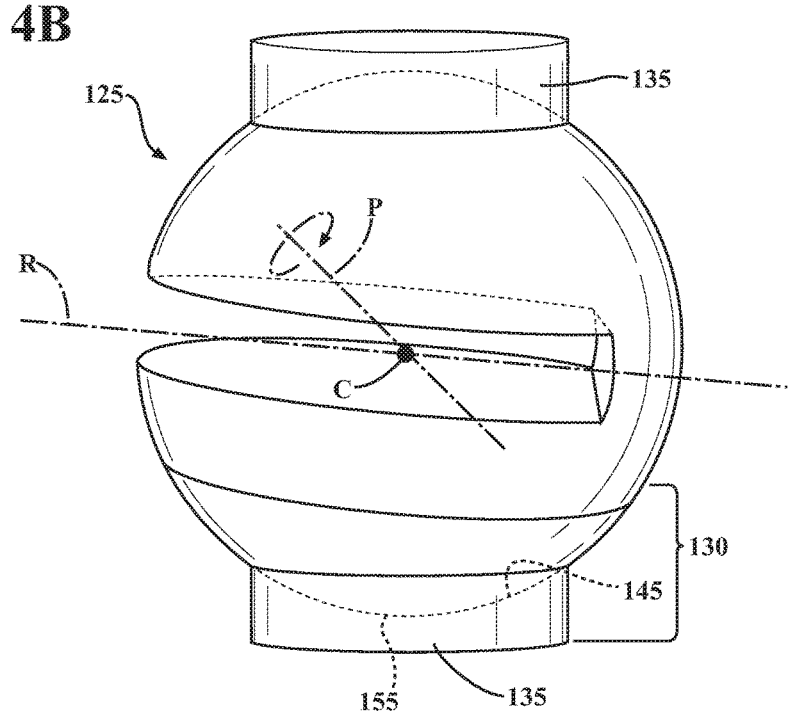

As an example, referring to FIG. 2 and FIG. 4A-FIG. 4B, where the acceleration identification module(s) 225 identifies a rear acceleration vector (e.g., the vehicle 100 is braking), the actuator control module(s) 235 can control one or more actuator(s) 230 to impart a rotational force on the glide face 155 to rotate the glide face 155. In doing so, the frame 125 can rotate about the reference point C along the pitch axis P. The actuator control module(s) 235 can control or more actuators 230 to rotate the frame 125 in substantially the same direction as the direction of the acceleration vector. As a result, the frame 125 rotates about the pitch axis P, thereby tilting (e.g., changing the pitch of) the human support surface 170 so as to counter the acceleration vector (e.g., towards the front of the vehicle 100). The frame 125 rotating about the pitch axis P can be best seen through the transition between FIG. 4A and FIG. 4B. In tilting (e.g., changing the pitch of) the human support surface 170, an occupant laying on or otherwise being supported by the human support surface 170 can have additional support in a region of the human support surface 170 proximate to the rear end of the vehicle 100. As a result, the occupant may experience an inertial force that is more in-line with the normal force N. In this regard, the occupant may not move on the human support surface 170 due to the human support surface 170 being tilted.

Figure 4C:
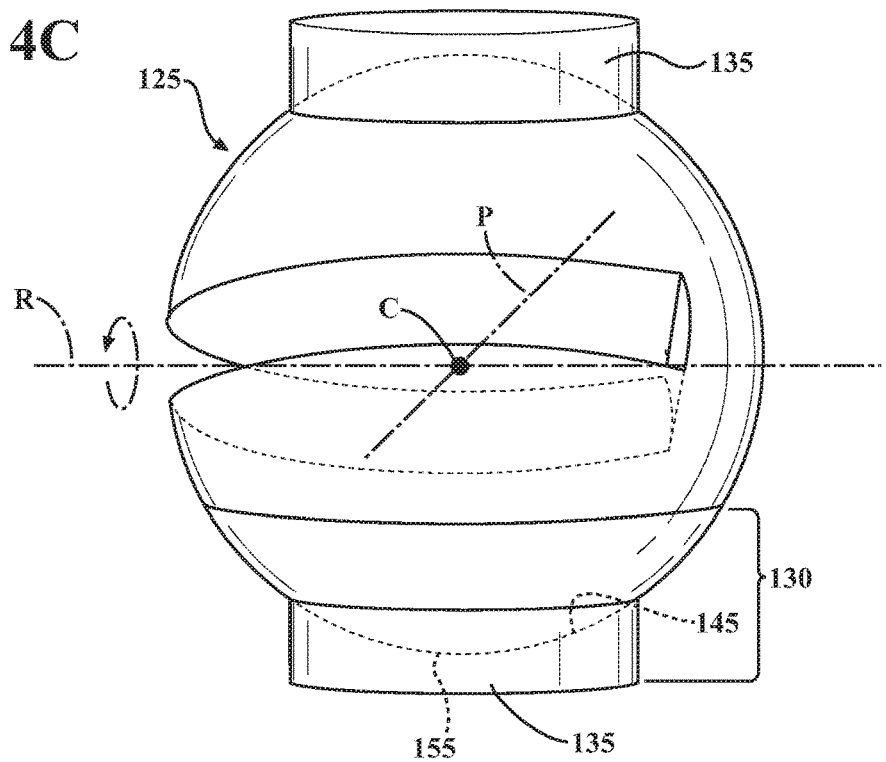
Figure 4D:
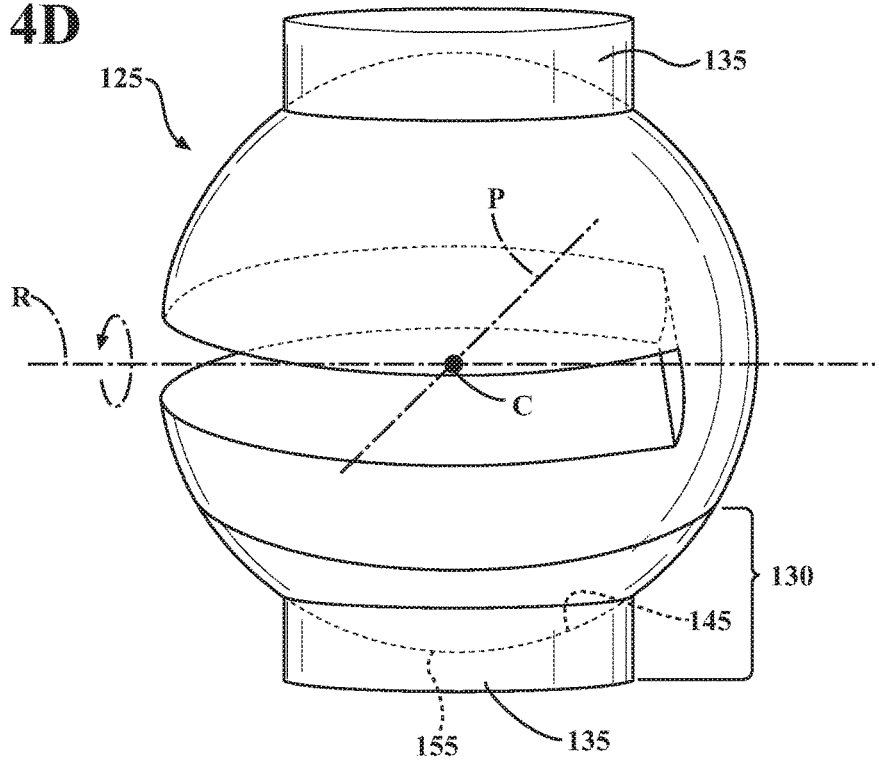

As another example, referring to FIG. 2 and FIG. 4C-FIG. 4D, where the acceleration identification module(s) 225 identifies a left acceleration vector (e.g., the vehicle 100 is turning or banking left), the actuator control module(s) 235 can control one or more actuator(s) 230 to impart a rotational force on the glide face 155 to rotate the glide face 155. In doing so, the frame 125 can rotate about the reference point C along the roll axis R. The actuator control module(s) 235 can control one or more actuators 230 to rotate the frame 125 in substantially the same direction as the direction of the acceleration vector. As a result, the frame 125 rotates counterclockwise about the roll axis R, thereby tilting (e.g., changing the roll of) the human support surface 170. The frame 125 rotating about the roll axis R can be best seen through the transition between FIG. 4C and FIG. 4D. In tilting (e.g., changing the roll of) the human support surface 170, an occupant laying on or otherwise being supported by the human support surface 170 can have additional support in a region of the human support surface proximate the right side of the vehicle 100. In this regard, as the vehicle 100 banks left, the human support surface 170 banks with the vehicle 100.

While these two examples are provided, the present disclosure is not limited to these two examples. For example, the actuator control module(s) 235 can also control one or more actuator(s) 230 to rotate the frame 125 about the reference point C along a yaw axis (not shown), and thereby change the yaw of the human support surface 170. Additionally, the actuator control module(s) 235 can control one or more actuator(s) 230 to rotate the frame 125 about the reference point C somewhere between the pitch axis P, the roll axis R, etc. Accordingly, the actuator control module(s) 235 can control various combinations of actuator(s) 230 to impart a rotational force on the frame 125 to rotate the frame 125 about the reference point C along different axes, thus generating multi-axis rotation of the frame 125.

In one or more arrangements, the actuator control module(s) 235 can determine which of the actuator(s) 230 to actuate based on the acceleration vector as determined by the acceleration identification module(s) 225. In some examples, the actuator control module(s) 235 can include or otherwise access a map of each actuator 230 on the actuator face 145 of the actuator plate 135. The map can include data on the axis of rotation for each actuator 230. The actuator control module(s) 235 can determine the direction of acceleration from the identified acceleration vector for the driving maneuver. The actuator control module(s) 235 can access the map to identify which actuator(s) 230 have an axis of rotation that is orthogonal to the direction of acceleration.

Where no actuator(s) 230 have an axis of rotation that is orthogonal to the direction of acceleration for the identified acceleration vector, in some arrangements, the actuator control module(s) 235 can determine which actuator(s) 230 have an axis of rotation that are substantially orthogonal to, or approximately orthogonal to, the direction of acceleration. In this regard, the actuator control module(s) 235 can identify one or more actuators that have an axis of rotation closest to orthogonal to the direction of acceleration for the driving maneuver(s). In other arrangements, the actuator control module(s) 235 can identify two or more actuator(s) 230 that, when the rotational force vectors resulting from rotating the actuator(s) 230 about their respective axes of rotation are combined, the combined rotational force vectors have a directional component that is substantially orthogonal to the direction of acceleration.

While these two examples are provided, the actuator control module(s) 235 can identify one or more actuator(s) 230 to control in any number of different ways. For example, in some arrangements, each maneuver stored on memory 210 may have actuator(s) 230 associated therewith. When the acceleration identification module(s) 225 identifies an upcoming maneuver, the actuator control module(s) 235 can identify the actuator(s) 230 associated with the upcoming maneuver. Accordingly, the present disclosure is not limited to the disclosed examples, and includes any methods of identifying which of a plurality of actuator(s) 230 to actuate to produce a rotational force on a body in a desired direction.

In one or more arrangements, the actuator control module(s) 235 can compare the magnitude of acceleration for the identified acceleration vector to a threshold magnitude. The threshold magnitude may be a magnitude that can cause an occupant of average size (e.g., 175 lbs., for example) to shift position while the occupant is laying on or otherwise being supported by the human support surface 170. In these arrangements, the actuator control module(s) 235 may generate actuator control signals for the one or more actuator(s) 230 when the magnitude of acceleration for the identified acceleration vector meets (e.g., is greater than or equal to) the threshold magnitude. In this regard, when the magnitude of acceleration is low relative to the threshold magnitude, the actuator control module(s) 235 may not tilt the human support surface 170.

The actuator control module(s) 235 can determine when the vehicle 100 will execute the maneuver(s). The actuator control module(s) 235 can control the one or more identified actuator(s) 230 to impart the rotational force on the frame 125 and thereby tilt the human support surface 170 as the vehicle 100 executes the maneuver(s). The actuator control module(s) 235 can cause the identified actuator(s) 230 to tilt the frame 125 to have a slope according to the magnitude of acceleration. For example, with more acceleration, the actuator control module(s) 235 can cause the actuator(s) 230 to tilt the human support surface 170 more steeply. As the acceleration decreases over time, the actuator(s) 230 can return the human support surface 170 to a position where the normal force is parallel (or substantially parallel) to gravity.

Figure 5:
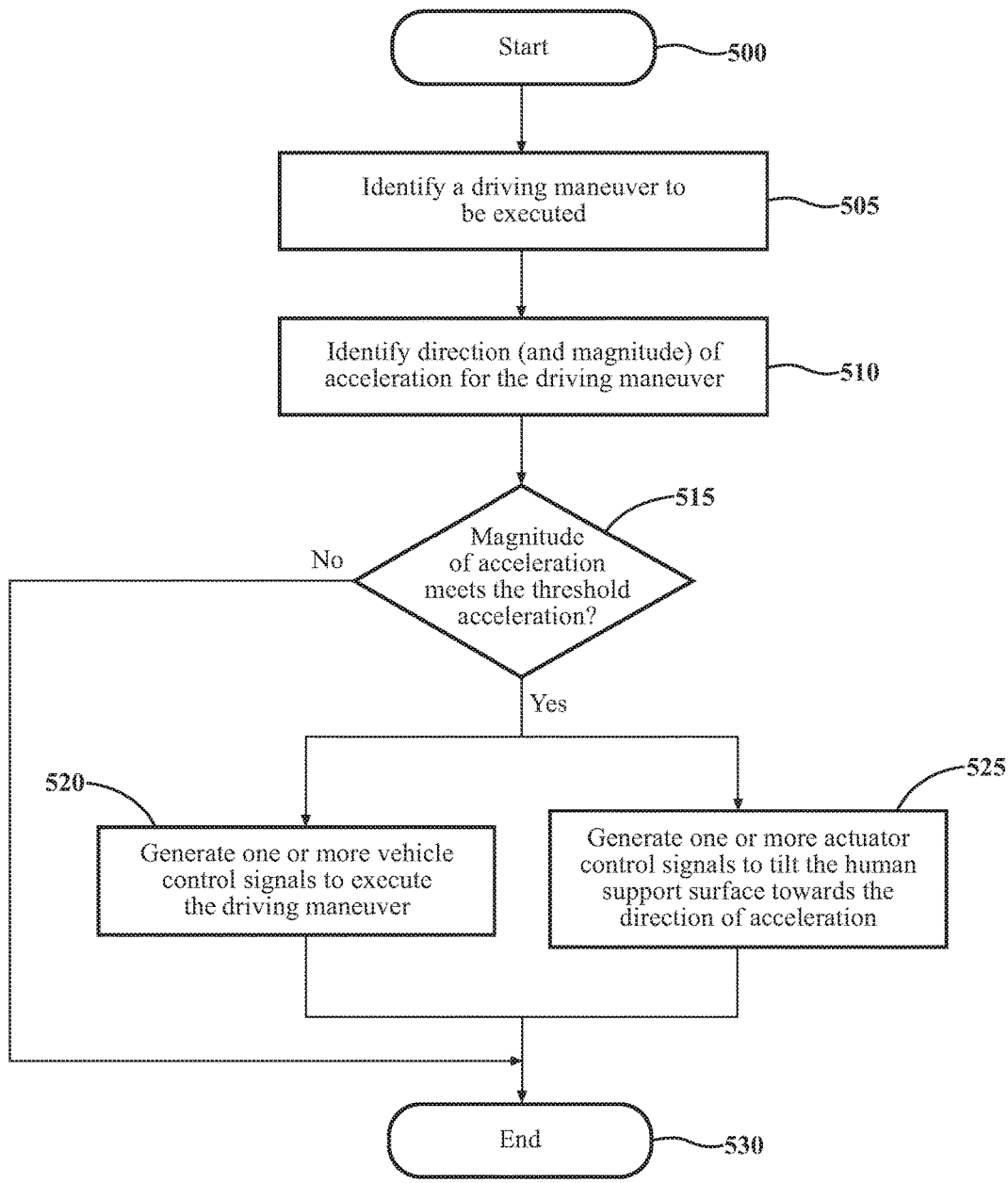
FIG. 5 depicts a flowchart showing an example method of tilting the human support surface in the vehicle of FIG. 1.

Referring now to FIG. 5, a flowchart depicting an example method of providing multi-axis rotation of a frame in a vehicle will be described. The flowchart shown in FIG. 5 is only for exemplary purposes. The following disclosure should not be limited to each and every function block shown in FIG. 5. To the contrary, the method does not require each and every function block shown. In some examples, the method may include additional function blocks. Further, the method does not need to be performed in the same chronological order shown in FIG. 5.

The method can begin at starting block 500. In some arrangements, the method can begin when the vehicle 100 is turned on, is in drive, neutral, reverse, etc. In some arrangements, the method can begin when the vehicle 100 is operated in an autonomous or semi-autonomous mode. The method can proceed to function block 505.

At function block 505, the automated control module(s) 220 can include instructions to determine a driving maneuver to be executed. As described above, the automated control module(s) 220 can include instructions to determine a change in motion for the vehicle 100. The automated control module(s) 220 can identify one or more driving maneuvers for implementing the determined change in motion. The method can continue to function block 510.

At function block 510, the acceleration identification module(s) 225 can include instructions to identify a direction (and magnitude) of acceleration for the driving maneuver. In some arrangements, the acceleration identification module(s) 225 may only identify the direction of acceleration. The acceleration identification module(s) 225 can include instructions to identify which driving maneuvers the vehicle 100 will execute. The acceleration identification module(s) 225 can include instructions to determine an acceleration vector for each of the one or more maneuvers that the vehicle 100 will execute. In another arrangement, the acceleration identification module(s) 225 can identify accelerations as they occur. The acceleration identification module(s) 225 can access data from the acceleration sensor(s) of the sensor system 215. In this regard, the acceleration identification module(s) 225 can identify accelerations via the acceleration sensor(s) in real-time or near real-time.

In some examples, the acceleration identification module(s) 225 can include or otherwise access a database including a plurality of directions of acceleration for a plurality of possible driving maneuvers that a given vehicle 100 may executed. The acceleration identification module(s) 225 can access the database and determine the direction of acceleration associated with the driving maneuver identified via the automated control module(s) 220. The acceleration identification module(s) 225 can determine the acceleration vector for the driving maneuver(s) by adding a predicted (or identified) magnitude of acceleration for the upcoming maneuver (as determined via the automated control module(s) 220) in the direction of acceleration associated with the upcoming maneuver(s). The method can continue to decision block 515.

At decision block 515, the actuator control module(s) 235 can compare the magnitude of acceleration for the upcoming maneuver(s) to a threshold magnitude. As stated above, the threshold magnitude may be a magnitude that can cause an occupant of average size (e.g., 175 lbs., for example) to shift position while the occupant is laying on or otherwise being supported by the human support surface 170. When the magnitude of acceleration is low relative to the threshold magnitude, the method can continue to ending block 530, which will be discussed below. However, where the magnitude of acceleration for the upcoming maneuver(s) meets (e.g., is greater than or equal to) the threshold magnitude, the method can continue to function blocks 520 and 525. In arrangements where the acceleration identification module(s) 225 only identify direction of acceleration, the method can proceed from function block 510 to function blocks 520 and 525.

At function block 520, the automated control module(s) 220 can include instructions to generate one or more vehicle control signals that cause the vehicle 100 to execute the driving maneuver(s), which will be discussed in greater detail below. In other arrangements, at function block 520, a driver of the vehicle 100 may control the vehicle 100. In this regard, the driver of the vehicle 100 can generate vehicle control signals (e.g., via inputs to the steering wheel, pedals, etc.) that cause the vehicle 100 to execute the driving maneuver(s).

At function block 525, the actuator control module(s) 235 can include instructions to generate one or more actuator control signals for the one or more actuator(s) 230. The actuator control module(s) 235 can control the actuator(s) 230 to impart a rotational force on the glide plate 155. The actuator(s) 230 can impart the rotational force on the glide plate 155 that is parallel to the direction of acceleration for the driving maneuver, and thereby rotate the frame 125 along the direction of acceleration. The actuator(s) 230 can rotate the frame 125 and thereby tilt the human support surface 170 of the frame 125. The actuator(s) 230 can tilt the human support surface 170 towards the direction of acceleration for the driving maneuver. As a result, a normal force vector for the human support surface 170 may have a directional component that is in the opposite direction as the direction of acceleration for the driving maneuver. In some arrangements, the actuator(s) 230 can tilt the human support surface 170 to have a slope that corresponds to the magnitude of acceleration for the upcoming maneuver. For example, as the magnitude of acceleration increases, the actuator(s) 230 can tilt the human support surface 170 more. Additionally, as the magnitude of acceleration changes over time, the actuator(s) 230 can correspondingly change the amount that the human support surface 170 is tilted.

In some arrangements, the steps performed at function blocks 520 and 525 may be performed substantially simultaneously. As an example, when the automated control module(s) 220 (or the driver) cause the vehicle 100 to execute a left turn, the actuator control module(s) 235 cause the human support surface 170 to bank left with the left turn. Therefore, as the vehicle 100 executes the maneuver, the human support surface 170 tilts.

From function block 520 and function block 525, the method can continue to ending block 530. At ending block 530, the method can end. The method can end when the vehicle 100 has executed the maneuver and the human support surface 170 has tilted.

In some arrangements, between function block 525 and ending block 530, the actuator control module(s) 235 can generate actuator control signal(s) to cause the human support surface 170 to tilt back to where the normal force vector for the human support surface 170 is substantially parallel to gravity.

In some arrangements, at function block 510, the vehicle 100 can verify the identified acceleration(s). The acceleration identification module(s) 225 can verify the magnitude and/or direction of acceleration for the driving maneuver based on data from the acceleration sensor(s) in the sensor system 215. In this regard, the acceleration identification module(s) 225 can verify the identified accelerations as they are occurring.

FIG. 2 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more examples, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more examples, the vehicle 100 is highly automated or completely automated. In one example, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a path. In one or more arrangements, the vehicle 100 is configured one or more semi-autonomous operational modes in which one or more computing systems control one or more components of the vehicle 100 to cause the vehicle 100 to follow a modified path deviating from the current path being followed by the vehicle operator. In this example, the one or more computing systems control one or more components of the vehicle 100 to cause the vehicle 100 to follow a modified path responsive to determining a deviation from the current path being followed by the vehicle operator.

In one or more arrangements, the memory 210 can include map data. The map data can include maps of one or more geographic areas. In some instances, the map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can be high quality and/or highly detailed.

In one or more arrangements, the map data can include one or more terrain maps. The terrain map(s) can include information about the ground, terrain, roads, surfaces, and/or other features of one or more geographic areas. The terrain map(s) can include elevation data in the one or more geographic areas. The map data can be high quality and/or highly detailed. The terrain map(s) can define one or more ground surfaces, which can include paved roads, unpaved roads, land, and other things that define a ground surface.

In one or more arrangements, the map data can include one or more static obstacle maps. The static obstacle map(s) can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills, etc. The static obstacles can be objects that extend above ground level. The one or more static obstacles included in the static obstacle map(s) can have location data, size data, dimension data, material data, and/or other data associated with it. The static obstacle map(s) can include measurements, dimensions, distances, and/or information for one or more static obstacles. The static obstacle map(s) can be high quality and/or highly detailed. The static obstacle map(s) can be updated to reflect changes within a mapped area.

The memory 210 can include sensor data. In this context, "sensor data" means any information about the sensors that the vehicle 100 is equipped with, including the capabilities and other information about such sensors. As will be explained below, the vehicle 100 can include the sensor system 215. The sensor data can relate to one or more sensors of the sensor system 215.

In some instances, at least a portion of the map data and/or the sensor data can be located in memory 210 located onboard the vehicle 100. Alternatively, or in addition, at least a portion of the map data and/or the sensor data can be located in memory 210 that is located remotely from the vehicle 100.

As noted above, the vehicle 100 can include the sensor system 215. The sensor system 215 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 215 includes a plurality of sensors, the sensors can work independently from each other. Alternatively, two or more of the sensors can work in combination with each other. In such case, the two or more sensors can form a sensor network. The sensor system 215 and/or the one or more sensors can be operatively connected to the processor(s) 205, the memory 210, and/or another element of the vehicle 100 (including any of the elements shown in FIG. 2). The sensor system 215 can acquire data of at least a portion of the external environment of the vehicle 100 (e.g., the present context).

The sensor system 215 can include any suitable type of sensor. Various examples of different types of sensors will be described herein. However, it will be understood that the examples are not limited to the particular sensors described. The sensor system 215 can include one or more vehicle sensors. The vehicle sensor(s) can detect, determine, and/or sense information about the vehicle 100 itself. In one or more arrangements, the vehicle sensor(s) can be configured to detect, and/or sense position and orientation changes of the vehicle 100, such as, for example, based on inertial acceleration. In one or more arrangements, the vehicle sensor(s) can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) can be configured to detect, and/or sense one or more characteristics of the vehicle 100. In one or more arrangements, the vehicle sensor(s) can include a speedometer to determine a current speed of the vehicle 100.

Alternatively, or in addition, the sensor system 215 can include one or more external environment sensors configured to acquire, and/or sense driving environment data. "Driving environment data" includes and data or information about the external environment in which an autonomous vehicle is located or one or more portions thereof. For example, the one or more external environment sensors can be configured to detect, quantify and/or sense obstacles in at least a portion of the external environment of the vehicle 100 and/or information/data about such obstacles. Such obstacles can be stationary objects and/or dynamic objects. The one or more external environment sensors can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 215 will be described herein. The example sensors can be part of the one or more external environment sensors and/or the one or more vehicle sensors. However, it will be understood that the examples are not limited to the particular sensors described.

As an example, in one or more arrangements, the sensor system 215 can include one or more radar sensors, one or more LIDAR sensors, one or more sonar sensors, and/or one or more cameras. In one or more arrangements, the one or more cameras can be high dynamic range (HDR) cameras or infrared (IR) cameras. In one or more arrangements, the one or more cameras can be hyperspectral cameras.

The vehicle 100 can include an input/output (I/O) system 245. An "input system" includes any device, component, system, element or arrangement or groups thereof that enable information/data to be entered into a machine. The input system can receive an input from a vehicle occupant (e.g. a driver or a passenger). An "output system" includes any device, component, or arrangement or groups thereof that enable information/data to be presented to a vehicle occupant (e.g. a person, a vehicle passenger, etc.). The input system and output system can together make up the I/O system 245.

The vehicle 100 can include one or more vehicle systems 240. Various examples of the one or more vehicle systems 240 are shown in FIG. 2. However, the vehicle 100 can include more, fewer, or different vehicle systems. It should be appreciated that although particular vehicle systems are separately defined, each or any of the systems or portions thereof can be otherwise combined or segregated via hardware and/or software within the vehicle 100. The vehicle 100 can include a propulsion system, a braking system, a steering system, throttle system, a transmission system, a signaling system, and/or a navigation system. Each of these systems can include one or more devices, components, and/or combination thereof, now known or later developed.

The navigation system can include one or more devices, applications, and/or combinations thereof, now known or later developed, configured to determine the geographic location of the vehicle 100 and/or to determine a travel route for the vehicle 100. The navigation system can include one or more mapping applications to determine a path for the vehicle 100. The navigation system can include a global positioning system, a local positioning system or a geolocation system.

The vehicle 100 can include an automated control module(s) 220. The automated control module(s) 220 can communicate with the various vehicle systems 240. In one or more arrangements, the processor(s) 205 and/or automated control module(s) 220 can be operatively connected to communicate with the various vehicle systems 240 and/or individual components thereof. For example, returning to FIG. 2, the processor(s) 205 and/or the automated control module(s) 220 can be in communication to send and/or receive information from the various vehicle systems 240 to control the movement, speed, maneuvering, heading, direction, etc. of the vehicle 100. The processor(s) 205 and/or the automated control module(s) 220 can control some or all of these vehicle systems 240 and, thus, the vehicle 100 can be partially or fully autonomous.

The processor(s) 205 and/or the automated control module(s) 220 can control the navigation and/or maneuvering of the vehicle 100 by controlling one or more of the vehicle systems 240 and/or components thereof. For instance, when operating in an autonomous or semi-autonomous mode, the processor(s) 205 and/or the automated control module(s) 220 can control the direction and/or speed of the vehicle 100. The processor(s) 205 and/or the automated control module(s) 220 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action can occur, either in a direct or indirect manner.

The vehicle 100 can include one or more vehicle actuators. The vehicle actuators can be any element or combination of elements operable to modify, adjust and/or alter one or more of the vehicle systems 240 or components thereof responsive to receiving vehicle control signals or other inputs from the processor(s) 205 and/or the automated control module(s) 220. Any suitable actuator can be used. For instance, the one or more vehicle actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by the processor(s) 205, implement one or more of the various processes described herein. One or more of the modules can be a component of the processor(s) 205, or one or more of the modules can be executed on and/or distributed among other processing systems to which the processor(s) 205 is operatively connected. The modules can include instructions (e.g., program logic) executable by one or more processor(s) 205. Alternatively, or in addition, the memory 210 can contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated control module(s) 220. The automated control module(s) 220 can receive data from the sensor system 215 and/or any other type of system capable of capturing information relating to the vehicle 100 and/or the external environment 200 of the vehicle 100. In one or more arrangements, the automated control module(s) 220 can use such data to generate one or more driving scene models. The automated control module(s) 220 can determine position and velocity of the vehicle 100. The automated control module(s) 220 can determine the location of obstacles, obstacles, or other environmental features including traffic signs, trees, shrubs, neighboring vehicles, pedestrians, etc.

The automated control module(s) 220 can receive, and/or determine location information for obstacles (e.g., the vehicle 100) within the external environment 200 of the vehicle 100 for use by the processor(s) 205, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated control module(s) 220 can determine path(s), current autonomous driving maneuvers for the vehicle 100, future autonomous driving maneuvers and/or modifications to current autonomous driving maneuvers based on data acquired by the sensor system 215, driving scene models, and/or data from any other suitable source.

The automated control module(s) 220 can determine one or more driving maneuvers to follow the selected path for the vehicle 100. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated control module(s) 220 can be configured can implement the determined driving maneuvers. The automated control module(s) 220 can cause, directly or indirectly, such autonomous driving maneuvers to be implemented. As used herein, "cause" or "causing" means to make, command, instruct, and/or enable an event or action to occur or at least be in a state where such event or action can occur, either in a direct or indirect manner. The automated control module(s) 220 can execute various vehicle functions and/or to transmit data to, receive data from, interact with, and/or control the vehicle 100 or one or more systems thereof (e.g. one or more of vehicle systems 240).

Detailed examples are disclosed herein. However, it is to be understood that the present disclosure is only intended for purposes of providing examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-5, but the examples are not limited to the illustrated structure or application.

The flowcharts and block diagrams in the figures illustrate the architecture, functionality, and operation of possible implementations of systems, methods and computer program products according to various examples. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for tilting a human support surface in a vehicle, comprising:
   a frame having a human support surface;
   a rotation system mounted between the frame and a vehicle surface, the rotation system including one or more actuators operable to impart rotation of the frame and an actuator plate carrying an array of the one or more actuators, the array of the one or more actuators defining a domed actuator face;
   a processor operatively connected to the one or more actuators; and
   memory operatively connected to the processor, the memory storing:

an acceleration identification module including instructions that, when executed by the processor, cause the processor to identify an acceleration associated with execution of a driving maneuver; and an actuator control module including instructions that, when executed by the processor, cause the processor to generate one or more actuator control signals for the one or more actuators to tilt the human support surface, by rotating the frame, so as to counter the acceleration as the driving maneuver is executed.

2. The system of claim 1, wherein the memory further stores:

an automated control module including instructions that, when executed by the processor, cause the processor to determine the driving maneuver to be executed, and to generate one or more vehicle control signals that cause the vehicle to execute the driving maneuver.

3. The system of claim 1, wherein the driving maneuver is executed by a driver of the vehicle.

4. The system of claim 1, wherein the one or more actuators are oriented in an array to provide multi-axis rotation of the frame by which the human support surface is tilted towards any direction.

5. The system of claim 1, wherein the rotation system further comprises:

a glide plate defining a domed glide face that is complementary to the domed actuator face.

6. The system of claim 5, wherein the domed glide face is seated against the domed actuator face.

7. The system of claim 5, wherein the actuator plate is mounted to the vehicle, and the glide plate is mounted to the frame.

8. The system of claim 5, wherein the domed actuator face is concave and the domed guide face is convex.

9. The system of claim 5, wherein the domed actuator face and the domed guide face are spherical.

10. The system of claim 5, wherein the frame includes a domed shell portion.

11. The system of claim 10, wherein the glide plate is featured along a convex outside of the domed shell portion.

12. The system of claim 10, wherein the domed shell portion of the frame is sphere-shaped.

* * * * *